United States Patent
Vaisanen et al.

(10) Patent No.: US 6,560,443 B1
(45) Date of Patent: May 6, 2003

(54) ANTENNA SHARING SWITCHING CIRCUITRY FOR MULTI-TRANSCEIVER MOBILE TERMINAL AND METHOD THEREFOR

(75) Inventors: Ari Vaisanen, Ruutana (FI); Pekko Orava, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/321,824

(22) Filed: May 28, 1999

(51) Int. Cl.[7] .................................................. H04B 1/38
(52) U.S. Cl. ........................... 455/73; 455/82; 455/552
(58) Field of Search .................................. 455/552, 553, 455/101, 103, 73, 129, 277.1, 289, 550, 78, 133, 82, 182; 375/220, 219

(56) References Cited

U.S. PATENT DOCUMENTS

| | | | | |
|---|---|---|---|---|
| 4,761,822 A | * | 8/1988 | Maile | .................. 455/82 |
| 5,276,920 A | | 1/1994 | Kuisma | |
| 5,410,738 A | | 4/1995 | Mud Rienk et al. | |
| 5,420,599 A | | 5/1995 | Erkocevic | |
| 5,463,406 A | * | 10/1995 | Vannatta et al. | ............ 343/702 |
| 5,507,035 A | * | 4/1996 | Bantz et al. | ................. 375/299 |
| 5,550,554 A | | 8/1996 | Erkocevic | |
| 5,715,525 A | * | 2/1998 | Tarusawa et al. | ........... 455/101 |
| 5,768,691 A | | 6/1998 | Matero et al. | |
| 5,794,159 A | | 8/1998 | Portin | |
| 5,822,693 A | * | 10/1998 | Harrison | ..................... 455/432 |
| 5,982,807 A | * | 11/1999 | Snell | .......................... 370/342 |
| 5,987,033 A | * | 11/1999 | Boer et al. | ................... 370/313 |
| 6,005,524 A | * | 12/1999 | Hayes et al. | ................. 343/702 |
| 6,055,422 A | * | 4/2000 | Saitoh | ..................... 455/277.1 |
| 6,138,010 A | * | 10/2000 | Rabe et al. | .................. 455/426 |
| 6,326,926 B1 | * | 12/2001 | Shoobridge et al. | ........ 343/702 |
| 2001/0012282 A1 | * | 8/2001 | Yegoshin | |
| 2002/0012381 A1 | * | 1/2002 | Mattisson et al. | |
| 2002/0025778 A1 | * | 2/2002 | Lee | |

FOREIGN PATENT DOCUMENTS

| | | |
|---|---|---|
| EP | 0 475 681 A2 | 3/1992 |
| EP | 0 575 203 A1 | 12/1993 |
| EP | 0623967 | 11/1994 |
| EP | 0 641 090 A2 | 1/1995 |
| EP | 0866588 | 9/1998 |

OTHER PUBLICATIONS

NEC Publication No. P12398EJ2V1DS00 (Second Edition), "L–Band SPDT Switch", Jan. 1998.

* cited by examiner

Primary Examiner—Charles N. Appiah
(74) Attorney, Agent, or Firm—Antonelli, Terry, Stout & Kraus, LLP (57) ABSTRACT

Antenna switching circuitry in a multi-transceiver mobile terminal 10, which features a first switching unit (SW1) which controllably couples a first transceiver port ($P_1$) to either a first antenna port ($P_{A1}$) or a second antenna port ($P_{A2}$); and a second switching unit (SW2) which controllably couples the second antenna port ($P_{A2}$) to either the first transceiver port ($P_1$), through the first switching unit (SW1), or to an input/output port ($P_{I/O}$) of a second transceiver (12). According to this scheme, the second antenna port is coupled to the input/output port of the second transceiver (12) in a mode in which the second transceiver (12) is operational, the first transceiver port ($P_1$) being decoupled from the second antenna port at this time, wherein the first transceiver port is coupled to the first antenna port and the input/output port of the second transceiver (12) is decoupled from the second antenna port, when the first transceiver is in a transmit mode, and wherein the first transceiver port is coupled to either of the first and second antenna ports, when the first transceiver (11) is in a receiving mode and the input/output port of the second transceiver (12) is decoupled from the second antenna port.

42 Claims, 4 Drawing Sheets

| SIGNAL | FUNCTION |
|---|---|
| ANTSEL | SELECT ANT1 IF ANTSEL = 0 (ANTSEL OVERRIDDEN WHEN TR=1) |
| BTSEL | BLUETOOTH ACTIVE IF BTSEL = 0 |
| TR | TRANSMITTER ACTIVE IF TR = 1 |
| TRX | INVERSE OF TR |

FIG. 3C

| VC1 | VC2 | CONNECTIONS |
|---|---|---|
| 0 | 0 | PORTS 1, 2 AND 3 ISOLATED |
| 0 | 1 | PORT 1-PORT 3, PORT 2 ISOLATED |
| 1 | 0 | PORT 1-PORT2, PORT 3 ISOLATED |
| 1 | 1 | PORTS 1, 2 AND 3 ISOLATED |

ANTENNA SHARING SWITCHING CIRCUITRY FOR MULTI-TRANSCEIVER MOBILE TERMINAL AND METHOD THEREFOR

FIELD OF THE INVENTION

This invention relates, generally, to the field of telecommunications/mobile terminals, such as mobile phones and the like and, more particularly, it relates to an antennae sharing scheme for diversity antennae in a dual-radio hand-held terminal such as IP (Internet Protocol) based WLAN (Wireless Local Area Network)/BT (Bluetooth) hand-held terminal.

BACKGROUND OF THE INVENTION

Figure 5:
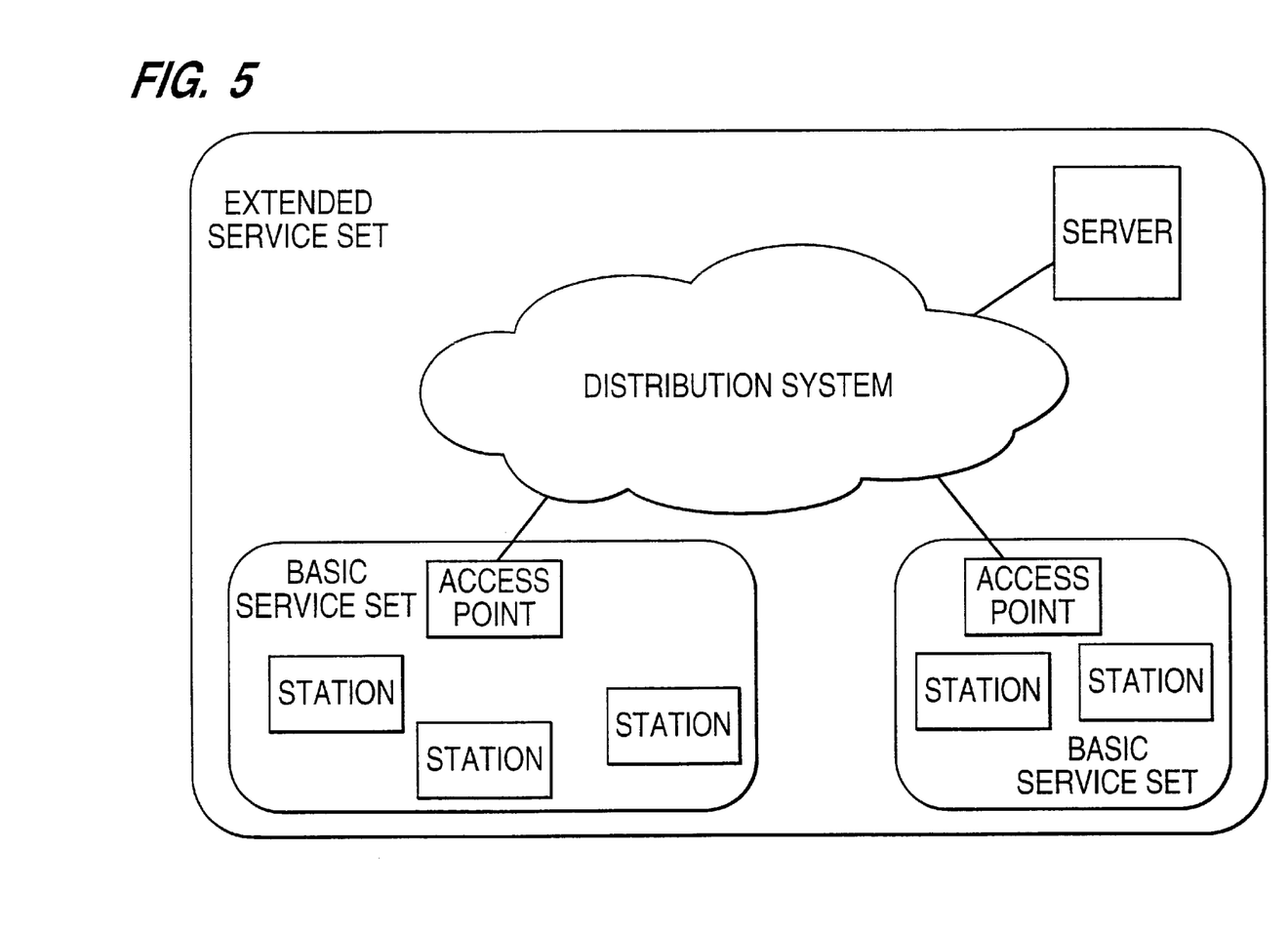
FIG. 5 represents a WLAN standard developed by the IEEE 802.11 committee.

Recently, a new technology has been developing which can expand the use of mobile phones in related hand-held mobile terminals using the same 2.4 GHz ISM (Industrial, Scientific and Medical) band as that employed by wireless LAN (WLAN) communication which conforms to the IEEE 802.11 standard such as for DSSS (Direct Sequence Spread Spectrum) radio communication, the contents of which are incorporated herein by reference. This new technology is referred to as Bluetooth (BT) which is a low-powered radio technology, having a range of approximately 10 cm to 10 m, but can be extended for greater distances through simply increasing the transmit power level. The frequency band of this new technology calls for an ISM radio band at 2.4 GHz, which is a license-free spectrum band, practically, available worldwide and which conforms to the wireless LAN (WLAN) radio ISM band conforming to IEEE 802.11 standard for DSSS radio communication. Employment of this low power/lower range ISM band to mobile phone technology would mean that cable hook-ups would no longer be required between laptop computers and cellular (or cell) phones to send E-mail, as one example. Further, business people would be able to surf the internet on their laptop, while their mobile phone is in their jacket pocket. That is, the mobile phone, as one example of a mobile terminal, will no longer have to be limited to a basic service set (BSS) link, which typically consists of a number of stations executing the same MAC (Medium Access Control) protocol in competing for access to the same shared medium. (The basic service set may be isolated or it may be connected to a backbone distribution system through an access point, the access point functioning as a bridge. The MAC protocol may be fully distributed or controlled by a central coordinated function housed in the access point. The basic service set generally corresponds to what is referred to as a cell in the literature. An extended service set (ESS) consists of two or more basic service sets interconnected by a distribution system. Such distribution system is, typically, a wired backbone LAN. The extended service set appears as a single logical LAN to the logical link control (LLC) level. FIG. 5 of the drawings typifies a wireless LAN model conforming to the IEEE 802.11 standard.)

In a WLAN link-up, a single access transceiver can support a small group of co-located users within a range of less than one hundred to several hundred feet, typically. On the other hand, Bluetooth technology will enable users to connect their mobile computers, digital cellular phones, hand-held devices, network access points and other mobile devices by wireless short-range radio links, unimpeded by line-of-site restrictions using substantially less power. Bluetooth (BT) technology will increase the ease of wireless communication by the ordinary citizen, as well as the scope of wireless connectivity. Also, since BT is limited to short range communication, typically, under 10 meters, for example, 2–3 meters, it uses a considerably lower power level than that of WLAN. Namely, for a mobile phone, a WLAN DSSS radio operating in the 2.4 GHz ISM band having 30–50 meter range, for example, would typically require about 100 mW power level, whereas a BT ISM FHSS (Frequency Hopping Spread Spectrum) radio or, simply, a BT ISM spread spectrum radio would require about 1 mW power level. This technology enables portable electronic devices to connect and communicate wirelessly via short range, ad hoc networks.

In order to function on a worldwide basis, Bluetooth requires a radio frequency that is license-free and open to any radio. The 2.4 GHz ISM band satisfies these requirements, the 2.4 GHz band actually being 2.4–2.483 GHz radio band. When a Bluetooth radio is applied to a mobile phone, the user can leave the mobile phone clipped to his belt or in a pocket and walk around for the entire dial-up-connection. Also, because there are no line-of-site requirements for Bluetooth devices, it is well suited for wireless connectivity, such as between a mobile phone and a notebook computer. For example, with Bluetooth, a person could synchronize their phone with a PC without taking the phone out of their pocket or briefcase. Users would be able to automatically receive E-mail on their notebook or laptop computers by the digital cellular phones in their pockets or synchronize their primary PC with their hand-held computer without taking it out of their briefcase. The omni-directional capability of Bluetooth allows synchronization to start when the phone is brought into range of the PC. It allows for a gross data rate of 1 Mbit/S, with second generation plans to be increased to a ratio of 2 Mbit/second. It uses packets switching protocol based on a frequency hopping scheme (analogous to IEEE 802.11 standard). Also, because of its omnidirectionality, authentication and encryption is also included, for security reasons, as part of the base band protocol thereof. That is, authentication relies on utilizing a secret key (i.e., password or PIN), thereby assuring security.

In view of the attributes of this low power ISM radio band and its relevance to mobile terminals, such as hand-held mobile (cellular) phones and the like, the present inventors have considered how to facilitate both the 2.4 GHz ISM band WLAN DSSS radio and the low power/short range 2.4 GHz ISM BT radio to effect a practical and cost-effective dual mode mobile terminal, namely, an IP based dual mode WLAN/BT hand-held terminal. Filter, antennae and RF switch components of a WLAN IEEE 802.11 DSSS radio and BT dual mode terminal can be shared in a number of ways, the inventors determined. In its simplest form, such components are not shared, that is, both radios are implemented as separate and independent units. However, this is obviously not the optimal solution, both in terms of cost, as well as practicality. On the other hand, combining a low power short range 2.4 GHz ISM radio band device like a BT radio and a substantially higher power level WLAN device, like the 802.11 DSSS radio, into a small sized hand-held terminal, has several drawbacks, namely, interference, resulting from sharing of antennae, filters and other components. In fact, sharing a diversity antennae scheme, filters and antennae switches between two 2.4 GHz radios in a dual mode terminal has not been implemented earlier, as far as known. Therefore, such problems had not existed in such a form, earlier. Dual band mobile phones have somewhat similar problems, but, however, as the two radios in the dual band mobile phone employ different frequency bands, different approaches are used.

The present invention specifically addresses the issue of antennae sharing between two 2.4 GHz radios in a dual mode terminal such as would be effected in connection with an IP based dual mode WLAN/BT hand-held terminal. The present inventors are not aware of any earlier attempts at effecting antennae sharing in such a dual mode terminal. On the other hand, the inventors are aware of several earlier attempts at diversity antennae sharing, but, however, only with regard to a standard WLAN operation. One such known earlier scheme was disclosed by Lucent Technologies in EP 0 623 967 A1, dated Nov. 9, 1994, which describes dual antennae diversity system for wireless LAN consisting of two L-shaped PIFA antennae. In that disclosure, a single pole dual terminal switch (SPDT) is employed to effect switching between the two antenna members in a receive mode and for switching to only one of the two antenna members for operation of the apparatus in a transmit mode. However, that earlier disclosure did not address the issue of antenna sharing of diversity antennae in a dual mode scheme which calls for a common radio band such as two 2.4 GHz radios, one being a WLAN radio conforming to the IEEE 802.11 standard, referred to above, the contents of which are incorporated herein by reference, and the other being a relatively low power/low range radio, for example, a BT ISM FHSS radio.

A slightly different antennae switch and filter arrangement of a WLAN radio, with no detailed antennae description, was disclosed by Harris Corporation in EP 0 866 588 A2, dated Sep. 23, 1998. This published application also does not disclose anything about an antennae sharing scheme of diversity antennae in a dual mode hand-held terminal as that to which the present invention addresses. However, the Harris disclosure does give an example of one wireless transceiver which may be readily used for WLAN applications in the 2.4 GHz ISM band according to the IEEE 802.11 standard for DSSS radio communication. Use of two diversity antennae, for example, PIFAs, in WLAN PC cards (previously known as PCMCIA card) is very popular because of multi-path propagation problems, while prior hand-held terminals operating on lower frequencies do not use diversity antennae.

OBJECTS OF THE INVENTION

It is an object of this invention to realize an antennae switching scheme for sharing diversity antennae efficiently and as economically as possible.

It is also an object of this invention to effect a substantially interference-free switching circuitry for sharing a pair of diversity antennae in a multi-transceiver mobile terminal such as a hand-held mobile terminal including, for example, mobile or cellular phones, although not limited thereto, in which both transceivers operate, substantially, on the same ISM radio band but having different power/range requirements.

It is a further object of invention to achieve a substantially interference-free antenna sharing scheme in the multi-transceiver mobile terminal where one of the transceivers is a WLAN radio and the other operates on substantially the same ISM radio band.

It is a still further object of this invention to achieve a substantially interference-free antennae sharing scheme in connection with a hand-held mobile terminal having diversity antennae for a dual mode mobile terminal having a WLAN radio operating on substantially a 2.4 GHz ISM band conforming to IEEE standard for DSSS radio communication and a relatively low power and short range spread spectrum radio operating on a substantially same ISM radio band as that of the WLAN radio. In this connection, this second lower power and shorter range radio can be one conforming to Bluetooth (BT) radio communication.

It is an additional object to implement an antennae switching scheme for antennae sharing of diversity antennae in the dual mode mobile terminal scheme which is both economical and practical and which can be implemented without having to add an additional antenna for the second transceiver.

It is still a further object of this invention to achieve an antennae sharing scheme in connection with a dual mode hand-held mobile terminal or hand-held terminal per se which can be implemented in a standard mobile terminal such as a mobile (cellular) phone and the like, a PDA (personal digital assistant), as well as other wireless communication links that can operate on an ISM radio band such as the 2.4 GHz DSSS WLAN conforming to the IEEE 802.11 standard, as one example (although not limited thereto).

It is also an object of the present invention to overcome any inherent problem directed to antennae sharing, antennae switching and pertaining to the filter chains associated with a WLAN/BT dual mode hand-held terminal, as one example, although not limited thereto. It is a still further to achieve an antennae sharing scheme which provides high performance in connection with the dual antennae receive mode of the diversity operation.

It is also an object of the present invention to minimize the number of RF switches and at the same time minimizing switch losses for purposes of optimizing performance during operation of either one of the transceivers (radios) in the mobile terminal.

SUMMARY OF THE INVENTION

The foregoing and other problems are overcome and the objects of the invention are realized through effecting antennae switching circuitry and antennae sharing method therefor for a multi-transceiver mobile terminal in accordance with the examples illustrated in the related embodiments of this invention.

In this connection the invention calls for a switching scheme for diversity antennae in a multi-transceiver mobile terminal where one such transceiver may be a WLAN conforming to the IEEE 802.11 standard for DSSS radio communication and the other may be a relatively lower power/lower range radio operating on the same ISM radio band as the WLAN such as conforming to Bluetooth radio, although not limited thereto. In accordance with this scheme, the dual transceivers are not required to operate at the same time. The dropping of an antennae connection and the setting up of a new antenna connection from scratch, of course, takes time and requires electrical power. Therefore, one featured aspect of the invention permits the first transceiver, for example, the WLAN radio, to act as a receiver only, including, for example, to monitor when the AP (access point) directed thereto becomes available for communication while the second transceiver is providing a needed connection, i.e., is operational. The present invention is achievable through using only the standard diversity antennae of the WLAN network of the mobile terminal.

According to a further aspect of the present invention, both the first and second transceivers, such as the WLAN and BT radios, are able to receive RF signals at the same time such as when the hand-held terminal is powered-up or in a situation where neither of the radios are connected, although a connection may be needed. The versatility of the mobile phone effects integration (i.e., connectivity) between mobile computers, digital phones, network access points within a short range scheme.

Although there are some minor drawbacks resulting from losses when switching from the second antenna, which is a diversity antenna shared between WLAN and Bluetooth, for example, the benefits arising as a result of using the low powered/low range Bluetooth radio, clearly, outweigh any such drawbacks. In this connection, the present invention features a scheme in which one of the two WLAN diversity antennae is switched for Bluetooth radio use when the Bluetooth radio needs to be functional. In general, the second transceiver, for example, the Bluetooth radio, is connected to the antenna port assigned thereto when the mobile terminal is physically outside the coverage area of the WLAN radio. Since the WLAN radio would typically be the preferred choice of communication linkage, in a mobile terminal where one of the transceivers is a WLAN and the other is a BT radio, the WLAN coverage can be monitored during the time the second transceiver, for example, the Bluetooth radio, is in use. During this time, the first transceiver is coupled at its receiver port to the first antenna monitoring an access point (AP), the access point becoming available through that one of the diversity antennae which is not being used by the Bluetooth radio.

Also in accordance with the present invention, it becomes possible for the first transceiver, for example, the WLAN radio, to receive or monitor its frequency band without being destructively interfered with by the transmitted signal from the BT module, since the BT module requires, typically, one milliwatt or less power level. However, use of the WLAN transmitter while the BT radio is operational is prohibited as damages to the BT radio might occur.

With regard to the question of diversity isolation during simultaneous operation of the two antennas, this isolation could be improved with a metallic structure connected as a shield and located between the antennae. That is, according to one featured aspect of the invention, the mobile terminal includes a pair of diversity antennae which are separated with a metallic structure, for example, a metallic plate attached to a ground plane and providing improved isolation to effect rf shielding. According to one disclosed embodiment, although not limited thereto, the invention calls for each of the antennae to be a planar inverted F antenna (PIFA). The PIFAs can be rectangular (inclusive of both square and oblong shaped rectangles) or even L-shaped, although not limited thereto. In this connection, the present invention has been schemed to enable optimal sharing of antennae and filter chains associated with the transceivers between that of the transmit and receive modes of two like ISM band radios such as the 2.4 GHz WLAN radio according to IEEE 802.11 standard for DSSS radio communication, and the 2.4 GHz BT spread spectrum radio, for dual mode mobile terminal implementation. The RF switches employed are illustrated, for example, as single pole double throw (SPDT) switches which are of well known variety which can be implemented in connection with a single RF chip or each can be associated with a separate semiconductor chip. In this connection, it is noted that both EP 0 623 967 A1 and EP 0 866 588 A2 disclose SPDTs; however, those SPDTs are employed for switching between the receive and transmit modes of a WLAN radio (single transceiver). An example of an SPDT switch usable in the present invention is the NEC μPG/52TA L-band SPDT (Single Pole Double Throw) GaAs FET switch which was developed for cellular or cordless telephone application and is disclosed in NEC publication document No. P12398EJ2V1DS00 (second edition), dated January 1998, the contents of which are incorporated herein by reference.

BRIEF DESCRIPTION OF THE DRAWINGS

The above set forth and other featured aspects of the invention are made more apparent in the ensuing detailed description of the invention when read in conjunction with the related examples described and illustrated in the accompanying drawings, wherein.

DETAILED DESCRIPTION OF THE INVENTION

Figure 1:
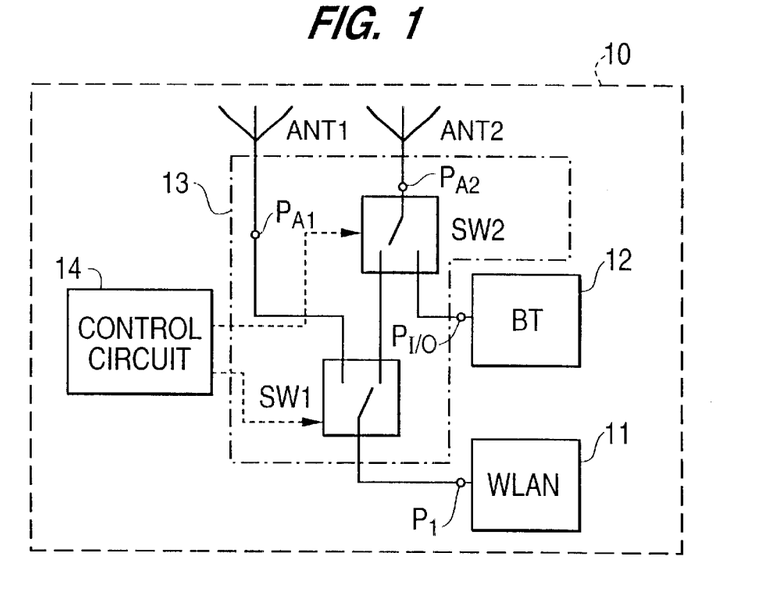
FIG. 1 is a schematic diagram illustrating the principle of the antenna sharing switching arrangement according to one embodiment of the present invention.

FIG. 1 illustrates the principle of the present invention in accordance with a first embodiment of the present invention in which 10 represents as mobile terminal such as a mobile (cellular) phone having a dual antenna, dual transceiver arrangement which can be, for example, an IP-based WLAN/Bluetooth hand-held terminal. The basic idea is to switch one of the two WLAN diversity antennae ANT1 and ANT2 for BT (Bluetooth) use, when BT needs to be functional. In general, BT connection is effected when the hand-held terminal is located outside the available coverage of WLAN. As the WLAN radio communication is the preferred method, WLAN coverage of an AP (access point) can be constantly monitored, while the BT radio (BT module) 12 is in use. Simultaneous operation is limited to the receive (rx) mode of the WLAN radio (WLAN module) 11 when the BT radio (BT module) 12 is operational, either in the receive (rx) or the transmit (tx) mode, in order to protect the BT transceiver from permanent damage.

Specifically, the antennae switching circuitry 13 in the multi-transceiver mobile terminal 10 has a first switching unit SW1 which controllably couples the first transceiver port $P_1$ to either a first antenna port $P_{A1}$ or a second antenna port $P_{A2}$, and has a second switching unit, namely, SPDT switch SW2, which couples the second antenna port $P_{A2}$ to either the first transceiver port $P_1$, through the first switching unit SW1, or to an input/output port $P_{I/O}$ of a second transceiver 12 which is, in this example, a BT radio having, substantially, a same ISM radio band as that of the WLAN module 11, such as, for example, a 2.4 GHz ISM band WLAN radio according to IEEE 802.11 standard for DSSS radio. In accordance with this embodiment, the SPDT switches SW1 and SW2 are controlled by the control circuit 14 in a manner in which the second antennae port $P_{A2}$ is coupled to the input/output port of the second transceiver 12 in a mode in which the second transceiver 12 is operational, at which time, also, the first transceiver port $P_{A1}$ is decoupled from the second antenna port $P_{A2}$. Also, the first transceiver port $P_1$ is coupled to the first antenna port $P_{A1}$ and the input/output port of the second transceiver 12 is decoupled from the second antennae port $P_{A2}$, when the first transceiver port is in the transmit mode, and, further, the first transceiver port $P_1$ is coupled to either of the first and second antennae ports, when the first transceiver is in a receiving mode and the input/output port $P_{I/O}$ of the second transceiver 12 is decoupled from the second antenna port $P_{A2}$. Also, according to this scheme, when the second transceiver 12 is operational, the second antennae port $P_{A2}$ is coupled to the input/output port of the second transceiver 12 and the first transceiver 11 is decoupled from the second antenna port $P_{A2}$ and is coupled to the first antenna port $P_{A1}$ as a receiver only. Simultaneous operation, however, is limited to, for example, WLAN rx with BT on rx or tx only. The second transceiver, for example, the BT module, cannot operate if the first transceiver, for example, the WLAN module, is transmitting.

This new scheme, according to the example illustrated in FIG. 1, provides for the implementation of an additional transceiver, such as the BT module 12, with the already existing first receiver, for example, a WLAN radio, in a standard size mobile terminal, without adding an additional antenna for the newly added BT module. Since an antennae diversity scheme would be preferable in connection with a 2.4 GHz ISM band WLAN device like IEEE 802.11 standard for DSSS radio communication to overcome multi-path propagation, using one of the two separate diversity antennae for occasional BT use saves the cost and space of adding yet another antennae to a standard size hand-held mobile terminal unit.

Figure 2:
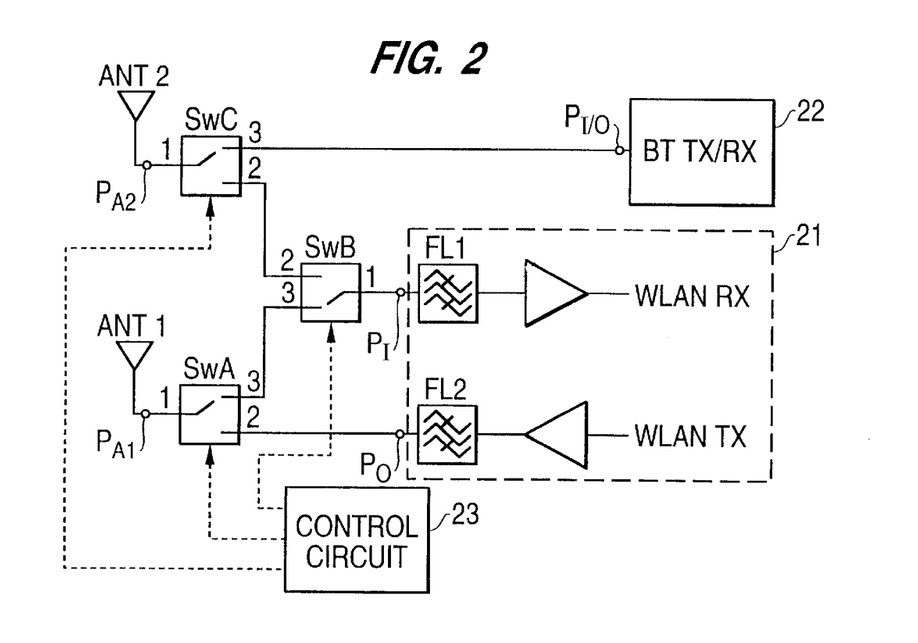
FIG. 2 is a diagram illustrating the antenna sharing switching arrangement according to another representative embodiment of the present invention.

FIG. 2 is illustrative of another embodiment which shows an antennae sharing switching arrangement for a multi-transceiver mobile terminal such as, although not limited thereto, an IP based dual mode WLAN/BT hand-held terminal. In accordance with this example illustration of the present invention, 21 represents the first transceiver, for example, 2.4 GHz ISM band WLAN module or device according to the IEEE 802.11 standard for DSSS radio communication and 22 represents the added second transceiver which is illustrated in this example, although not limited thereto, to a BT module.

In the embodiment of FIG. 2, in the WLAN transmit mode, or the first mode, the third SPDT switch SwC is switched to the position 2 where it connects a second antenna port $P_{A2}$ to the second switch SwB. In this mode, also, the first switching unit SwA is switched from position 3 to position 2 thereof to thereby form a connection to the output port $P_O$ of the WLAN module. Under this WLAN transmit mode, only antenna ANT1 is used as the WLAN transmit antenna. The second switching unit SwB is switched to the position where it connects the WLAN receive chain at the input port $P_I$ to the unconnected port 3 of switch SwA so as to prevent the WLAN transmit signal which is coupled from the first antenna ANT1 to the second antenna ANT2 from leaking into the WLAN receive chain. Filter FL2 in the WLAN transmit chain can be optimally chosen therefor best performance since it does not have to be shared with the WLAN receive chain under this operation mode.

According to a second mode, namely, the BT mode, the third switching unit SwC is switched to a position 3 where it connects the BT module to the second antenna port $P_{A2}$.

In this BT mode, the second switching unit SwB switches to the position 3 where the WLAN receive chain, including filter FL1 is connected to the first switching unit SwA in order to minimize leakage of the BT transmit signal into the receiver port of the WLAN module. In this BT mode, the WLAN coverage can be monitored by switching SwA to a position 3 where it connects the first antenna port to the WLAN receiver chain via second switching unit SwB.

In accordance with a third mode, namely, the WLAN receive mode, the third switching unit SwC is switched to a position where the second antenna port $P_{A2}$ is coupled to switch SwB. Also, first switching unit SwA is switched to a position where it connects the first antenna port $P_{A1}$ to switch SwB. Through turning of the second switching unit SwB antenna, diversity selection can be made between the first and second antennae ports. Filter FL1 in the WLAN receive chain can be optimally chosen for best performance as it does not have to be shared with the WLAN transmit chain.

Figure 3A:
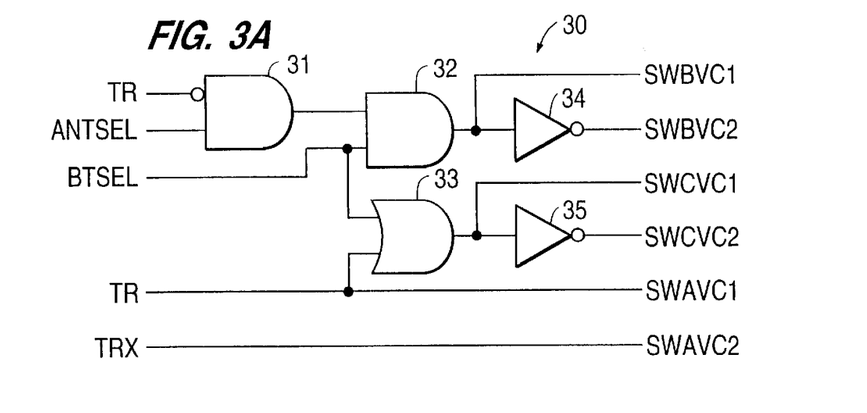
FIG. 3A illustrates an example of a logic circuit diagram relating to the control circuit according to FIG. 2.
Figure 3B:
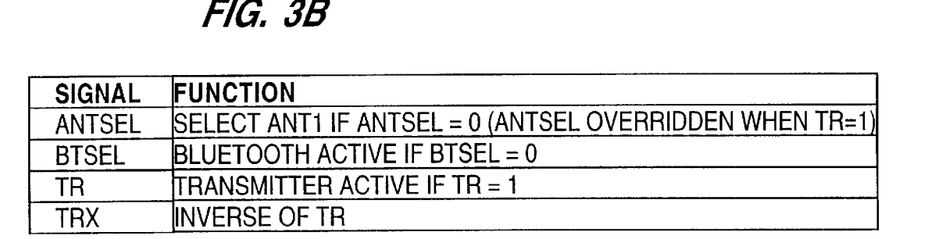
FIG. 3B is illustrative of an example of signal descriptions associated with the antenna switch control logic arrangement in FIG. 3A.
Figure 3C:
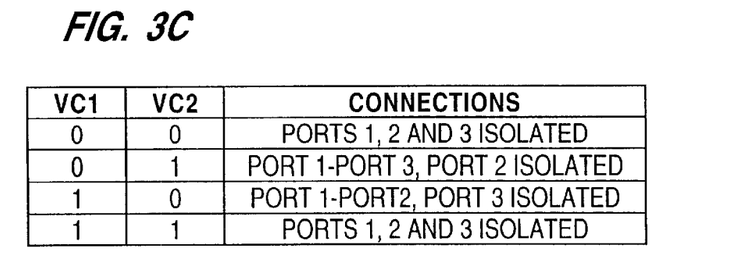
FIG. 3C is illustrative of an example of the antennae switch truth table as it relates to the embodiment in FIG. 2 of the drawings.

The operation of the example in FIG. 2, of another embodiment according to the present invention, can be clearly understood in connection with the signal description and the switch truth table schemes shown in FIGS. 3B and 3C of the drawings, respectively, in conjunction with the antennae switch logic operation effected by the logic circuitry shown in FIG. 3A of the drawings as it relates to the control circuit 23 in FIG. 2 thereof. In this connection, when the logic values of VC1 and VC2 as they relate to each of the three switching units, are at logic 0, all three ports of the SPDT switches are isolated. This is similarly the case when the logic values of VC1 and VC2 are both at 1. On the other hand, when VC1 of each switch is at logic 0 and VC 2 of each switch is at logic 1, a connection is effected between the second antenna port and the BT module, and a connection is effected between the receiver port of the WLAN module and the first antenna port. When the logic levels of VC1 and VC2 are reversed, the WLAN module is in the transmit mode.

Figure 4:
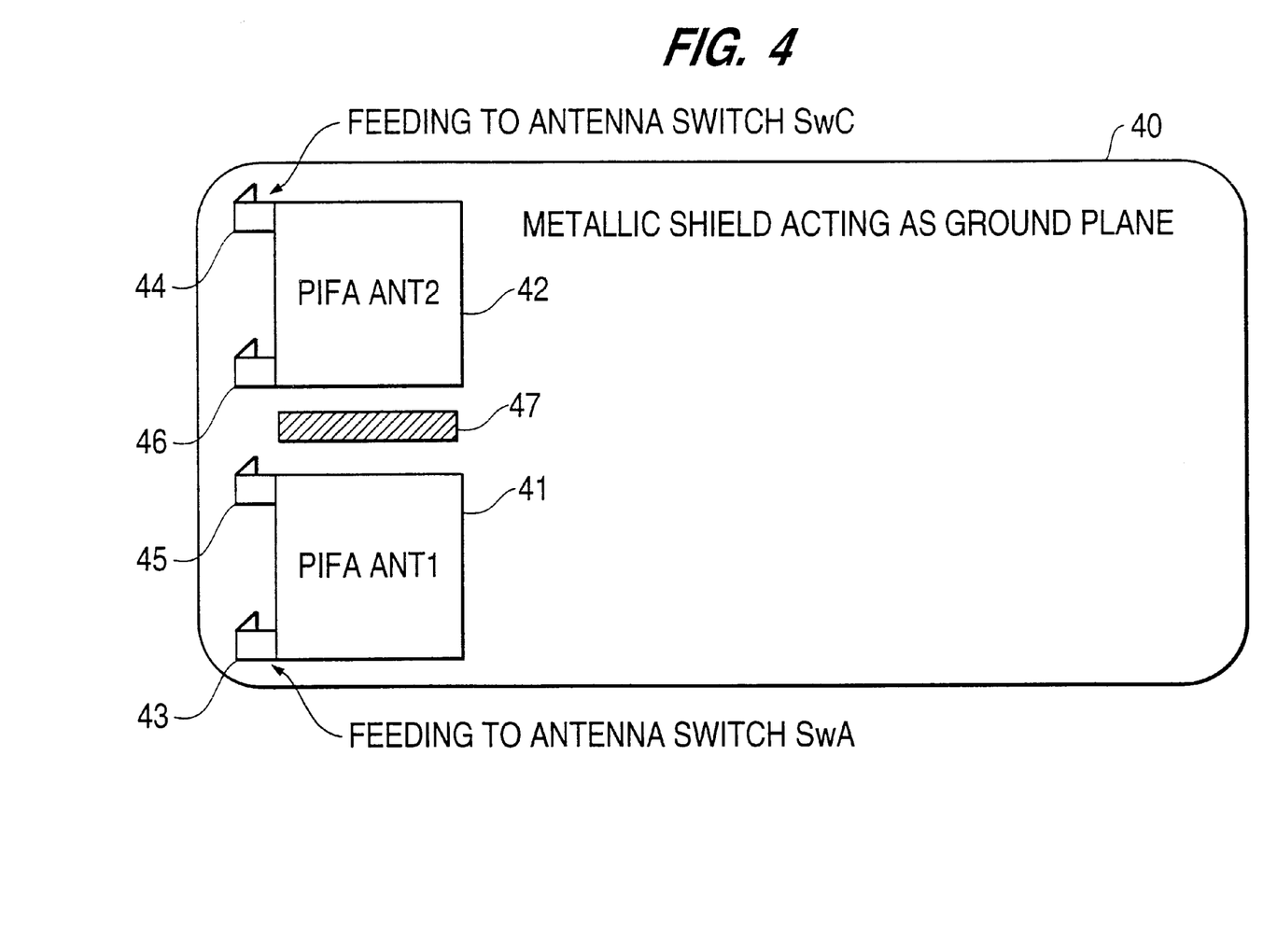
FIG. 4 illustrates an antenna system consisting of two high efficiency PIFA-type rectangular antennae, which are useable in the antenna sharing scheme of the present invention, according to one example.

Using the antennae schemes shown in FIG. 4 of the drawings, as an example, 40 represents the metallic shield that acts as a ground plane, 41 and 42 are square/rectangular shaped PIFA antennae to be used, although not limited thereto, in the examples in FIGS. 1 and 2, 43 and 44 are the connecting terminals of the respective PIFA antenna to the switching units SwA and SwC, respectively, 45 and 46 represent the ground terminal connections of the antennae and 47, provided optionally, is a metallic plate attached to ground plane 40 and providing improved isolation to effect shielding between PIFAs 41 and 42. Although the antennae illustrated in FIG. 4 are square-shaped rectangles, this should not be considered as being limited thereto. Other shapes including other rectangular shapes (e.g., elongated) and even L-shaped planar antennae are applicable to the present invention, either in connection with the embodiments in FIGS. 1 and 2 or in connection with other example embodiments relating to the present invention. With regard to FIG. 2, moreover, in the BT mode, the square shaped PIFA antenna ANT2 is connected to the BT module and the square-shaped PIFA antenna ANT1 is connected to the WLAN receiver to enable the monitoring capability of the WLAN while the BT module is in operation.

On the other hand, in the WLAN receive mode, either one of the diversity PIFA antennae can be connected to the WLAN receiver to enable receive antenna diversity and, moreover, in the WLAN transmit mode, PIFA antenna ANT1 is connected to the WLAN transmitter side without sharing the filter chain of the receiver side of the WLAN radio. Filters in the transmit chain, as well as in the receive chain, of the WLAN module can be optimally chosen for best performance, as the filters do not have to be shared. Also, the positioning of the two square shaped diversity PIFA antennae (although other shapes and types are applicable herein also) along with the metallic plate is chosen to maximize diversity separation, efficiency, as well as antennae gain.

As can be seen from FIG. 3A of the drawings, which is one example of the control circuitry (although not limited thereto), control of the three RF switching units is achieved with relatively few logic gates, namely, AND gates 31 and 32, OR gate 33 and inverters 34 and 35. In this connection, it is noted that each signal line associated with control circuit 23, pertains to a complementary pair of control signal lines such as shown in FIG. 3A. Incidentally, a similar such logic gate arrangement can be effected with regard to the control circuit of FIG. 1. Also, using low power consumption logic to control the switches instead of direct control of the switches by individual settings specific thereto, assures that only those desired combinations of switch settings are made possible.

This new intended switching scheme for a multi-transceiver mobile terminal and method therefor solves the problems associated with the sharing of antennae, antennae switching and sharing of the filter chains of, for example, a WLAN/BT dual mode hand-held terminal. The two square shaped PIFA antennae which represent one example of antennae to be used in mobile terminals such as that discussed above are implemented to enable efficient sharing of the antenna system between the two 2.4 GHz ISM radios. Simultaneously, the antenna system provides high performance dual antenna receive diversity operation. Moreover, the radio frequency (RF) switching circuitry according to the present invention, is optimally sized with as low a number of switches as possible, while simultaneously minimizing switching operation losses to optimize performance of either one of the dual radio transceivers. Further, RF filters can be chosen/implemented independently from each other, thereby enabling optimization of the response of the filter cascade for either function associated with the WLAN transceiver. Moreover, low power consumption is used in connection with the logic operation for driving the switches into only wanted positions, while prohibiting the possibility of the switches effecting an unwanted switching mode.

While the invention has been particularly shown and described with respect to the above examples of preferred embodiments thereof, it will be understood by those of ordinary skill in this area of technology that changes in form and details may be made therein, including in the form of other embodiments, without departing from the scope and spirit of the invention, which is defined by the appended claims.

What is claimed:

1. Switching circuitry for diversity antennas in a multi-transceiver mobile terminal, comprising:

a first switching unit which controllably couples a first transceiver port to either a first antenna port or a second antenna port; and a second switching unit which controllably couples said second antenna port to either said first transceiver port, through said first switching unit, or to an input/output port of a second transceiver, wherein said second antenna port is coupled to said input/output port of said second transceiver in a mode in which said second transceiver is operational, said first transceiver port being decoupled from said second antenna port at this time, wherein said first transceiver port is coupled to said first antenna port and said input/output port of said second transceiver is decoupled from said second antenna port, when said first transceiver is in a transmit mode, and wherein said first transceiver port is coupled to either of said first and second antenna ports, when said first transceiver is in a receiving mode and said input/output port of said second transceiver is decoupled from said second antenna port.

2. The antenna switching circuitry according to claim 1, wherein, in the mode in which said second transceiver is operational, said second antenna port is coupled to said input/output port of said second transceiver, and said first transceiver is decoupled from said second antenna port and is coupled to said first antenna port as a receiver only.

3. The antenna switching circuitry according to claim 1, wherein said first transceiver is a WLAN radio and said second transceiver is a relatively lower power and shorter range radio operating on a substantially same ISM radio band as said WLAN radio.

4. The antenna switching circuitry according to claim 1, wherein said first transceiver is a WLAN radio operating on substantially a 2.4 GHz ISM band conforming to IEEE 802.11 standard inclusive of DSSS radio communication and said second transceiver is a relatively lower power and shorter range spread spectrum radio operating on a substantially same ISM radio band as said WLAN radio.

5. The antenna switching circuitry according to claim 1, wherein said first and second switching units include a single pole double throw switch, respectively.

6. The antenna switching circuitry according to claim 1, wherein said mobile terminal is a mobile phone including a pair of diversity antennas associated with said first and second antenna ports, respectively.

7. The antenna switching circuitry according to claim 1, wherein the mobile terminal is a two-antenna, two-transceiver handheld mobile terminal, both transceivers operating substantially on the same ISM radio band, but having different power/range requirements.

8. The antenna switching circuitry according to claim 1, wherein said mobile terminal includes a pair of diversity antennas associated with said first and second antenna ports, respectively, said diversity antennas being separated with a metallic structure, attached to a ground plane and providing isolation between the antennas to effect rf shielding.

9. The antenna switching circuitry according to claim 1, wherein each of said diversity antennas is a Planar Inverted F Antenna (PIFA).

10. Switching circuitry for diversity antennas in a multi-transceiver mobile terminal, comprising:

a first switching unit which couples an output port of a first transceiver to a first antenna port in a first operation mode, a second switching unit which couples an input port of said first transceiver to (i) said first antenna port in a second operation mode and to (ii) either said first antenna port or to a second antenna port in a third operation mode; and a third switching unit which couples said second antenna port to an input/output port of a second transceiver in said second operation mode, said output port of said first transceiver being decoupled from said first antenna port in said second operation mode.

11. The switching circuitry according to claim 10,
wherein the coupling of said input port of said first transceiver to said first antenna port is through said second and first switching units and the coupling of said input port of said first transceiver to said second antenna port is through said second and third switching units.

12. The switching circuitry according to claim 10,
wherein said first, second and third switching units include a single pole double terminal switch, respectively.

13. The switching circuitry according to claim 10,
wherein said first transceiver is a WLAN radio and said second transceiver is a relatively lower power and shorter range radio operating on a substantially same ISM radio band as said WLAN radio.

14. The switching circuitry according to claim 10,
wherein said first transceiver is a WLAN radio operating on substantially a 2.4 GHz ISM band conforming to IEEE 802.11 standard inclusive of DSSS radio communication and said second transceiver is a relatively lower power and shorter range spread spectrum radio operating on a substantially same ISM radio band as said WLAN radio.

15. The switching circuitry according to claim 10,
wherein said diversity antennas are separated with a metallic structure, attached to a ground plane and providing isolation between the antennas to effect rf shielding.

16. The switching circuitry according to claim 10,
wherein each of said diversity antennas is a Planar Inverted F Antenna (PIFA).

17. The switching circuitry according to claim 10,
wherein the mobile terminal is a two-antenna, two-transceiver handheld mobile terminal, both transceivers operating substantially on the same radio band, but having different power/range requirements.

18. The switching circuitry according to claim 10,
wherein said mobile terminal is a mobile phone including a pair of diversity antennas associated with said first and second antenna ports, respectively.

19. Antenna sharing method, in a multi-transceiver mobile terminal having diversity antennas, comprising:
providing, in said mobile terminal, switching circuitry including
(a) a first switching unit which controllably couples a first transceiver port to either a first antenna port or a second antenna port; and
(b) a second switching unit which controllably couples said second antenna port to either said first transceiver port, through said first switching unit, or to an input/output port of a second transceiver,
wherein said second antenna port is coupled to said input/output port of said second transceiver in a mode in which said second transceiver is operational, said first transceiver port being decoupled from said second antenna port at this time,
wherein said first transceiver port is coupled to said first antenna port and said input/output port of said second transceiver is decoupled from said second antenna port, when said first transceiver is in a transmit mode, and
wherein said first transceiver port is coupled to either of said first and second antenna ports, when said first transceiver is in a receiving mode and said input/output port of said second transceiver is decoupled from said second antenna port.

20. The antenna sharing method according to claim 19,
wherein, in the mode in which said second transceiver is operational, said second antenna port is coupled to said input/output port of said second transceiver, and said first transceiver is decoupled from said second antenna port and is coupled to said first antenna port as a receiver only.

21. The antenna sharing method according to claim 19,
wherein said first transceiver is a WLAN radio and said second transceiver is a relatively lower power and shorter range radio operating on a substantially same ISM radio band as said WLAN radio.

22. The antenna sharing method according to claim 19,
wherein said first transceiver is a WLAN radio operating on substantially a 2.4 GHz ISM band conforming to IEEE 802.11 standard inclusive of DSSS radio communication and said second transceiver is a relatively lower power and shorter range spread spectrum radio operating on a substantially same ISM radio band as said WLAN radio.

23. The antenna sharing method according to claim 19,
wherein said first and second switching units include a single pole double throw switch, respectively.

24. The antenna sharing method according to claim 19,
wherein said mobile terminal is a mobile phone including a pair of diversity antennas associated with said first and second antenna ports, respectively.

25. The antenna sharing method according to claim 19,
wherein the mobile terminal is a two-antenna, two-transceiver handheld mobile terminal, both transceivers operating substantially on the same radio band, but having different power/range requirements.

26. The antenna sharing method according to claim 19,
wherein said mobile terminal includes a pair of diversity antennas associated with said first and second antenna ports, respectively, said diversity antennas being separated with a metallic structure, attached to a ground plane and providing isolation between the antennas to effect rf shielding.

27. The antenna sharing method according to claim 19,
wherein each of said diversity antennas is a Planar Inverted F Antenna (PIFA).

28. Antenna sharing method, in a multi-transceiver mobile terminal having diversity antennas, comprising:
providing, in said mobile terminal, switching circuitry including
(a) a first switching unit which couples an output port of a first transceiver to a first antenna port in a first operation mode;
(b) a second switching unit which couples an input port of said first transceiver to (i) said first antenna port in a second operation mode and to (ii) either said first antenna port or to a second antenna port in a third operation mode; and
(c) a third switching unit which couples said second antenna port to an input/output port of a second transceiver in said second operation mode, said output port of said first transceiver being decoupled from said first antenna port in said second operation mode.

29. The antenna sharing method according to claim 28,
wherein the coupling of said input port of said first transceiver to said first antenna port is through said second and first switching units and the coupling of said input port of said first transceiver to said second antenna port is through said second and third switching units.

30. The antenna sharing method according to claim 28, wherein said first, second and third switching units include a single pole dual terminal switch, respectively.

31. The antenna sharing method according to claim 28, wherein said first transceiver is a WLAN radio and said second transceiver is a relatively lower power and shorter range radio operating on a substantially same ISM radio band as said WLAN radio.

32. The antenna sharing method according to claim 28, wherein said first transceiver is a WLAN radio operating on substantially a 2.4 GHz ISM band conforming to IEEE 802.11 standard inclusive of DSSS radio communication and said second transceiver is a relatively lower power and shorter range spread spectrum radio operating on a substantially same ISM radio band as said WLAN radio.

33. The antenna sharing method according to claim 28, wherein the mobile terminal is a two-antenna, two-transceiver handheld mobile terminal.

34. The antenna sharing method according to claim 28, wherein the mobile terminal is a two-antenna, two-transceiver mobile phone.

35. The antenna sharing method according to claim 28, wherein said diversity antennas are separated with a metallic plate, attached to a ground plane and providing isolation between the antennas to effect rf shielding.

36. The antenna sharing method according to claim 28, wherein each of said diversity antennas is a Planar Inverted F Antenna (PIFA).

37. A multi-transceiver mobile terminal having diversity antennas and switching circuitry comprising:

a first switching unit which controllably couples a first transceiver port to either a first antenna port or a second antenna port; and a second switching unit which controllably couples said second antenna port to either said first transceiver port, through said first switching unit, or to an input/output port of a second transceiver, wherein said second antenna port is coupled to said input/output port of said second transceiver in a mode in which said second transceiver is operational, said first transceiver port being decoupled from said second antenna port at this time, wherein said first transceiver port is coupled to said first antenna port and said input/output port of said second transceiver is decoupled from said second antenna port, when said first transceiver is in a transmit mode, and wherein said first transceiver port is coupled to either of said first and second antenna ports, when said first transceiver is in a receiving mode and said input/output port of said second transceiver is decoupled from said second antenna port.

38. The multi-transceiver mobile terminal according to claim 37, wherein, in the mode in which said second transceiver is operational, said second antenna port is coupled to said input/output port of said second transceiver, and said first transceiver is decoupled from said second antenna port and is coupled to said first antenna port as a receiver only.

39. A multi-transceiver mobile terminal having diversity antennas and switching circuitry comprising:

a first switching unit which couples an output port of a first transceiver to a first antenna port in a first operation mode, a second switching unit which couples an input port of said first transceiver to (i) said first antenna port in a second operation mode and to (ii) either said first antenna port or to a second antenna port in a third operation mode; and a third switching unit which couples said second antenna port to an input/output port of a second transceiver in said second operation mode, said output port of said first transceiver being decoupled from said first antenna port in said second operation mode.

40. The multi-transceiver mobile terminal according to claim 39, wherein the coupling of said input port of said first transceiver to said first antenna port is through said second and first switching units and the coupling of said input port of said first transceiver to said second antenna port is through said second and third switching units.

41. A mobile terminal comprising:

at least two transceivers; and antenna switching circuitry including at least two antenna ports, each of which is associated with a diversity antenna, and at least two switching units to control the connection between said antenna ports and said transceivers, wherein said switching units are controlled at least such that (i) a same antenna port becomes coupled to a first transceiver and to a second transceiver at different times and (ii) said first transceiver is coupled to either of said two antenna ports, when said first transceiver is in a receiving mode and said second transreceiver is decoupled from both its transmitting and receiving modes.

42. The mobile terminal according to claim 41, wherein said first and second transceivers are for two separate communication systems operating substantially on the same frequency band.

* * * * *